(12) United States Patent
Zhao et al.

(10) Patent No.: US 6,518,981 B2
(45) Date of Patent: Feb. 11, 2003

(54) GENERATING AND USING A COLOR PALETTE

(75) Inventors: Jun Zhao, San Jose, CA (US); Timothy L. Kohler, Mountain View, CA (US); Jonathan Hui, Fremont, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/969,058

(22) Filed: Nov. 12, 1997

(65) Prior Publication Data

US 2002/0080153 A1 Jun. 27, 2002

(51) Int. Cl.$^7$ .................................................. G09G 5/00
(52) U.S. Cl. ...................... 345/764; 345/589; 345/593; 345/601; 382/168
(58) Field of Search .................................. 382/162, 164, 382/166, 168, 171, 163, 165, 170; 345/199, 431, 589, 590, 591, 593, 597, 600, 601, 604, 682; 358/525

(56) References Cited

U.S. PATENT DOCUMENTS

| | | | | |
|---|---|---|---|---|
| 4,907,075 A | | 3/1990 | Braudsway | 358/75 |
| 5,081,450 A | | 1/1992 | Lucas et al. | 340/728 |
| 5,138,303 A | | 8/1992 | Rupel | 340/703 |
| 5,241,658 A | | 8/1993 | Masterson et al. | 395/162 |
| 5,311,212 A | * | 5/1994 | Beretta | 345/150 |
| 5,365,252 A | | 11/1994 | Lo | 345/153 |
| 5,418,895 A | | 5/1995 | Lee | 395/131 |
| 5,434,957 A | | 7/1995 | Moller | 395/131 |
| 5,469,190 A | | 11/1995 | Masterson | 345/155 |
| 5,537,579 A | | 7/1996 | Hiroyuki | 395/500 |

* cited by examiner

Primary Examiner—Ra Huynh
(74) Attorney, Agent, or Firm—Fitzpatrick, Cella, Harper & Scinto

(57) ABSTRACT

To generate a color palette having m colors (such as $2^8=256$ colors) from a color image described in a color space, pixel image data corresponding to the color image is first obtained. A frequency of occurrence for each color in the pixel image data is then determined. Each color in the pixel image data is assigned to one of a predetermined number of cells into which the color space has been partitioned, the predetermined number being not greater than m. The most commonly occurring color is selected in each cell in which a color exists, so as to obtain n palette colors. A vote value is calculated for each unselected color, the vote value being based at least in part on the frequency of occurrence of the color in the pixel image and a weighting factor based on a rank of the color in its corresponding cell, the unselected colors being the colors not selected in the first selecting step. Thereafter, m-n colors are selected as the unselected colors with the highest vote values. Also, input colors in a color image described in a color space are mapped to a reduced palette of m colors derived by partitioning the color space into a predetermined number of cells, there being at least one palette color in each cell that includes an input color. The mapping is performed by determining in which cell each input color lies, and mapping each input color to the closest palette color from among all palette colors in the cell identified for that input color.

52 Claims, 13 Drawing Sheets

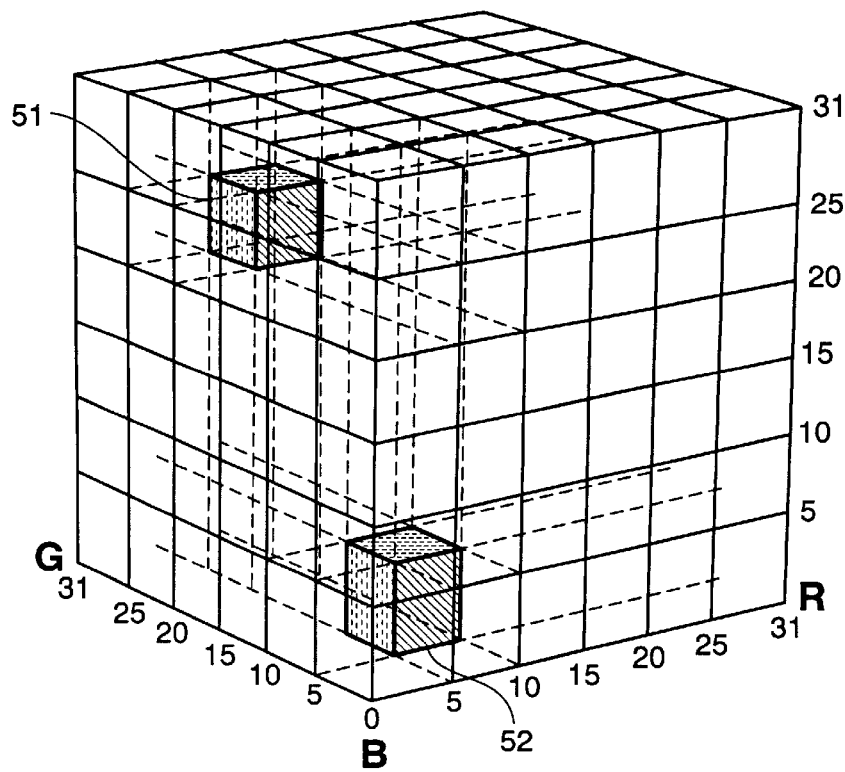
FIG. 5
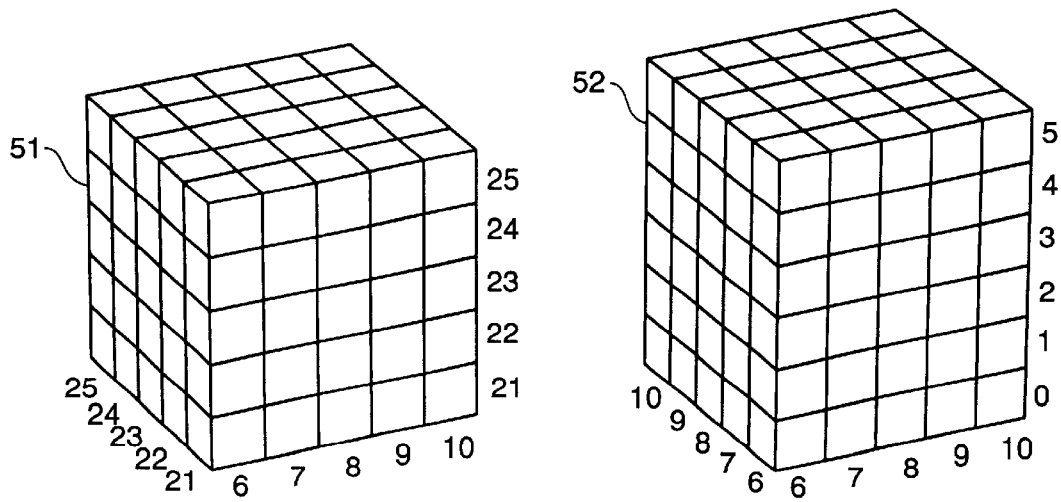
FIG. 6A          FIG. 6B

| CODE | CELL | R | G | B |
|---|---|---|---|---|
| 0 | 2 - 3 - 5 | 104 | 128 | 240 |
| 1 | 1 - 0 - 2 | 48 | 40 | 96 |
| ⋮ | ⋮ | ⋮ | ⋮ | ⋮ |
| 255 | 4 - 4 - 1 | 168 | 200 | 56 |

FIG. 10A

| CELL | NUMBER OF COLORS IN THE CELL | R | G | B | CODE |
|---|---|---|---|---|---|
| 0,0,0 | 3 | ✶ ✶ ✶ | ✶ ✶ ✶ | ✶ ✶ ✶ | ✶ ✶ ✶ |
| 0,0,1 | 2 | ✶ ✶ | ✶ ✶ | ✶ ✶ | ✶ ✶ |
| ⋮ | ⋮ | ⋮ | ⋮ | ⋮ | ⋮ |
| 2,1,3 | 0 | / | / | / | / |
| ⋮ | ⋮ | ⋮ | ⋮ | ⋮ | ⋮ |
| 5,5,4 | 1 | ✶ | ✶ | ✶ | ✶ |
| 5,5,5 | 4 | ✶ ✶ ✶ ✶ | ✶ ✶ ✶ ✶ | ✶ ✶ ✶ ✶ | ✶ ✶ ✶ ✶ |

FIG. 10B

GENERATING AND USING A COLOR PALETTE

BACKGROUND OF THE INVENTION

1. Field of the Invention

The present invention concerns generating and using a color palette, and more particularly, a color palette which can be used for displaying, storing and transmitting color images in a computer or other digital image processing device.

2. Description of the Related Art

To process or display a color image in a computer or other digital image processing device, the color component values for each pixel in the image must be specified. For example, in the RGB (red, green, blue) color space, a color image can be represented by specifying each of the red, green and blue intensity levels for each pixel in the image. In this regard, 8 bits per color have been found to yield visually acceptable results. However, this requires 24 bits per pixel which, given the high resolutions frequently used, can mean that a significant amount of data is required to represent a single color image. Manipulating such a large amount of data requires both a large amount of memory and a large amount of processing time.

Accordingly, conventional techniques have been proposed to use a much smaller set of colors to represent an image. Such a set is conventionally known as a color palette, and often contains 256 different colors. As previously noted, each pixel in a color image is ordinarily represented by 24 bits, which can define $2^{24}$ or more than 16.7 million different colors. Therefore, by replacing each color in a color image with one of the colors in a 256 color palette, each pixel in a color image can be represented by an 8 bit index into the color palette, rather than 24 bits of color information. Moreover, if the palette colors are selected correctly and a unique palette is used for a particular image, in many cases the image quality is not significantly decreased.

One problem then is how to appropriately select the palette colors. Stated another way, given that 24-bit color image data may have up to 16.7 million colors, the problem is how to select 256 out of those 16.7 million colors that will represent the image well.

Various conventional techniques have been proposed for generating palette colors. However, each has its own problems. For example, some conventional techniques do not in many cases select the palette of colors that would provide good visual results for the subject image. Other conventional techniques ignore small isolated colors, even though such colors may be important to the overall impression of the image. Some other conventional techniques are very computationally intensive, and consequently result in slow processing speeds. With still other techniques, after the palette colors are generated, mapping from the image colors to the palette colors is difficult. That is, after the palette colors have been identified, it is cumbersome to identify for each pixel in the input image which palette color is "closest" to the true image color.

SUMMARY OF THE INVENTION

The present invention addresses the foregoing problems by generating a color palette for an image by partitioning the color space into a predetermined number of cells, which is less than the number of colors required in the palette, selecting at least one color from each cell in which an image color exists, and selecting the remaining palette colors based on how the remaining image colors are distributed among the cells.

According to one aspect of the invention, to generate a color palette having m colors (such as $2^8$=256 colors) from a color image described in a color space, pixel image data corresponding to the color image is first obtained. A frequency of occurrence for each color in the pixel image data is then determined. Each color in the pixel image data is assigned to one of a predetermined number (k) of cells into which the color space has been partitioned, where k<m. For instance, each axis of the color space might be divided into 6 approximately equal-sized intervals, resulting in k=6×6×6=216 rectangular box-shaped cells. The most commonly occurring color is selected in each cell in which a color exists, so as to obtain n palette colors, with $n \leq k$. A vote value is calculated for each unselected color, the vote value being based at least in part on the frequency of occurrence of the color in the pixel image and a weighting factor based on a rank of the color in its corresponding cell, the unselected colors being the colors not selected in the first selecting step. Thereafter, the remaining m-n palette colors are selected as the unselected colors with the highest vote values.

By virtue of the foregoing arrangement, each and every original color in the input color image will have a palette color that is close, regardless of how infrequently an original color occurs. As a result, even colors having a relatively low frequency of occurrence in the image can be closely represented in the palette. Moreover, since each palette color is associated with a cell, a structure is inherently provided for organizing the palette colors, and the input image colors can therefore be readily mapped to corresponding palette colors.

According to a further aspect of the invention, a color palette having m colors (such as 256 colors) is generated from a color image having a number of pixels, each pixel described in a color space. The color of each pixel in the color image is first quantized by zeroing least significant bits of each color component for the pixel. The frequency of occurrence of each quantized color is counted. Each quantized color in the color image is assigned to one of a predetermined number (k) of cells into which the color space has been partitioned, where k<m. For instance, each axis of the color space might be divided into 6 approximately equal-sized intervals, resulting in k=6×6×6=216 rectangular box-shaped cells. The most commonly occurring quantized color in each cell in which a quantized color exists is selected, based on the count, so as to obtain n palette colors, with $n \leq k$. The unselected colors in each cell are then ranked based on their relative frequencies of occurrence, with higher ranking colors occurring more frequently than lower ranking colors in the same cell, the unselected colors being the quantized colors not selected in the first selecting step. A weighting factor is calculated for each unselected color, the weighting factor being based on the rank of the unselected color, with higher ranking colors receiving a greater weighting factor than lower ranking colors. A vote value is assigned to each unselected color, the vote value being based at least in part on the frequency of occurrence of the quantized color and the assigned weighting factor for the quantized color. Finally, the remaining m-n palette colors are selected as the unselected colors with the highest vote values.

By virtue of the foregoing, the present invention can simultaneously select palette colors so as to produce good visual results for a variety of input images, identify the palette colors quickly, and provide a structure for organizing the palette colors which permits fast mapping of the input image colors.

According to a still further aspect of the invention, input colors in a color image described in a color space are mapped to a reduced palette of m colors derived by partitioning the color space into a predetermined number of cells, there being at least one palette color in each cell that includes an input color. The mapping is performed by determining in which cell each input color lies, and mapping each input color to the closest palette color from among all palette colors in the cell identified for that input color.

By virtue of the foregoing arrangement, the processing time for mapping of colors in an input color image to the selected palette colors can be reduced, since only distances to palette colors in the same cell need to be calculated.

According to more particularized aspects of the invention, the cell in which an input color lies is determined by finding a three-dimensional vector. The vector is determined for each input color by partitioning each color component in the color space into a predetermined number of ranges, and determining into which range each color component of the input color falls.

The foregoing can permit quick identification of the cell in which an color lies, thereby providing even faster mapping of colors in an input color image to the selected palette colors.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

FIG. 5 depicts the RGB color space partitioned according to a representative embodiment of the invention.

FIGS. 6A and 6B illustrate representative color cells in the partitioned color space shown in FIG. 5.

FIGS. 10A and 10B show color palette tables used in a representative embodiment of the invention.

DETAILED DESCRIPTION OF THE PREFERRED EMBODIMENTS

Figure 1:
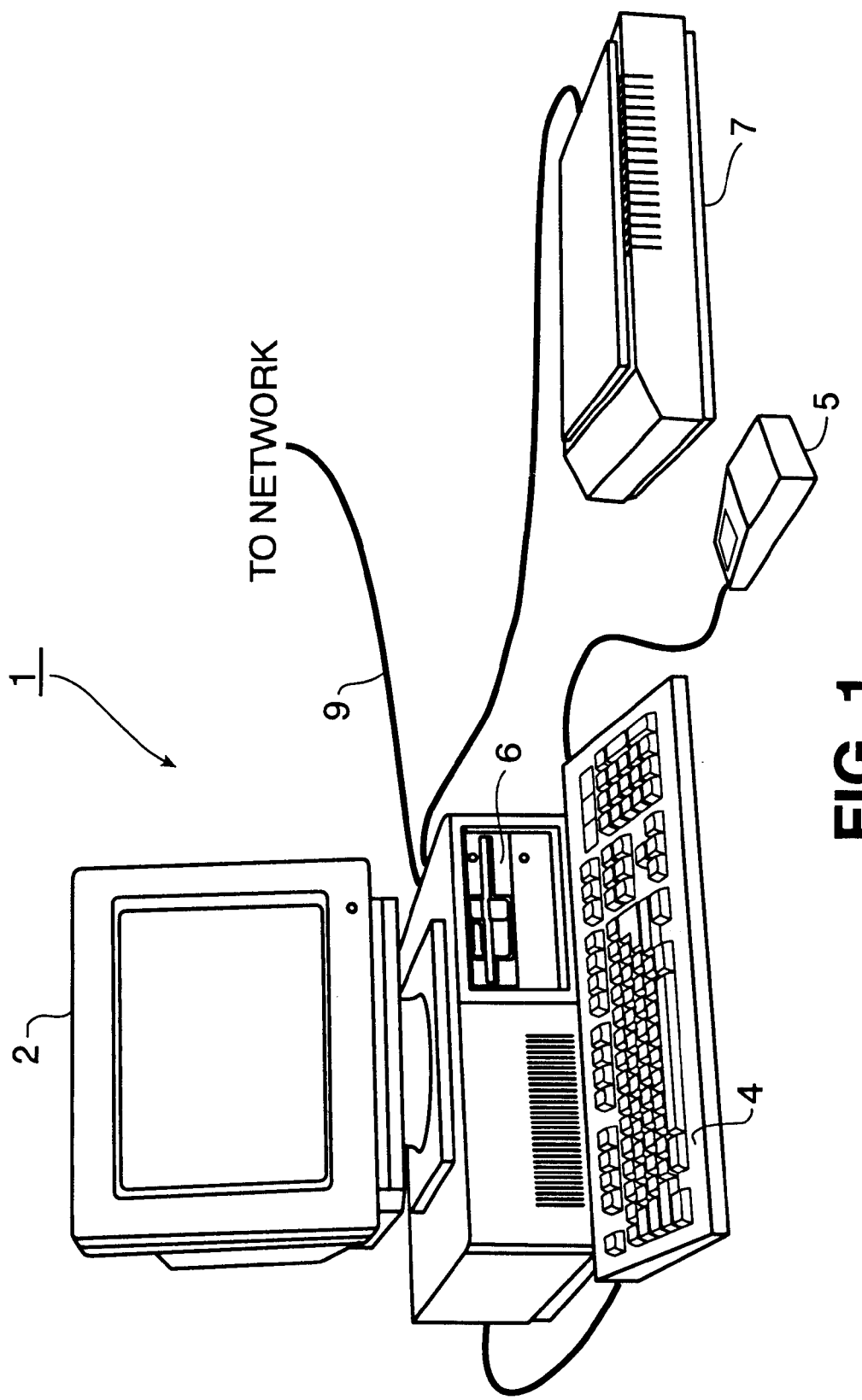
FIG. 1 is a perspective view of the outward appearance of a workstation embodying the invention.

FIG. 1 shows the outward appearance of a representative embodiment of the present invention. Shown in FIG. 1 is computing equipment 1, such as a Macintosh or an IBM PC-compatible computer having a windowing environment, such as Microsoft® Windows. Provided with computing equipment 1 is display screen 2, such as a color monitor, keyboard 4 for entering text data and user commands, and pointing device 5, such as a mouse, for pointing to and manipulating objects displayed on display screen 2.

Computing equipment 1 includes a mass storage device, such as computer disk 6, for storing data files, which can include word processing and spreadsheet documents, image data in full color or reduced color format, and other data files, and for storing application programs such as color reduction programs, image processing programs, word and spreadsheet processing programs, and other information processing programs. Such application programs contain stored program instruction sequences by which computing equipment 1 manipulates and stores data files on disk 6 and presents data in those files to an operator via the display screen 2.

Image data is input from scanner 7 which scans documents or other images and provides bit map images of those documents to computing equipment 1. Image data may also be input into computing equipment 1 from a variety of other sources, either directly or via network interface 9.

It should be understood that, although programmable general-purpose computer equipment is shown in FIG. 1, a dedicated or stand-alone computer or other types of image processing equipment can be used in the practice of the present invention.

Figure 2:
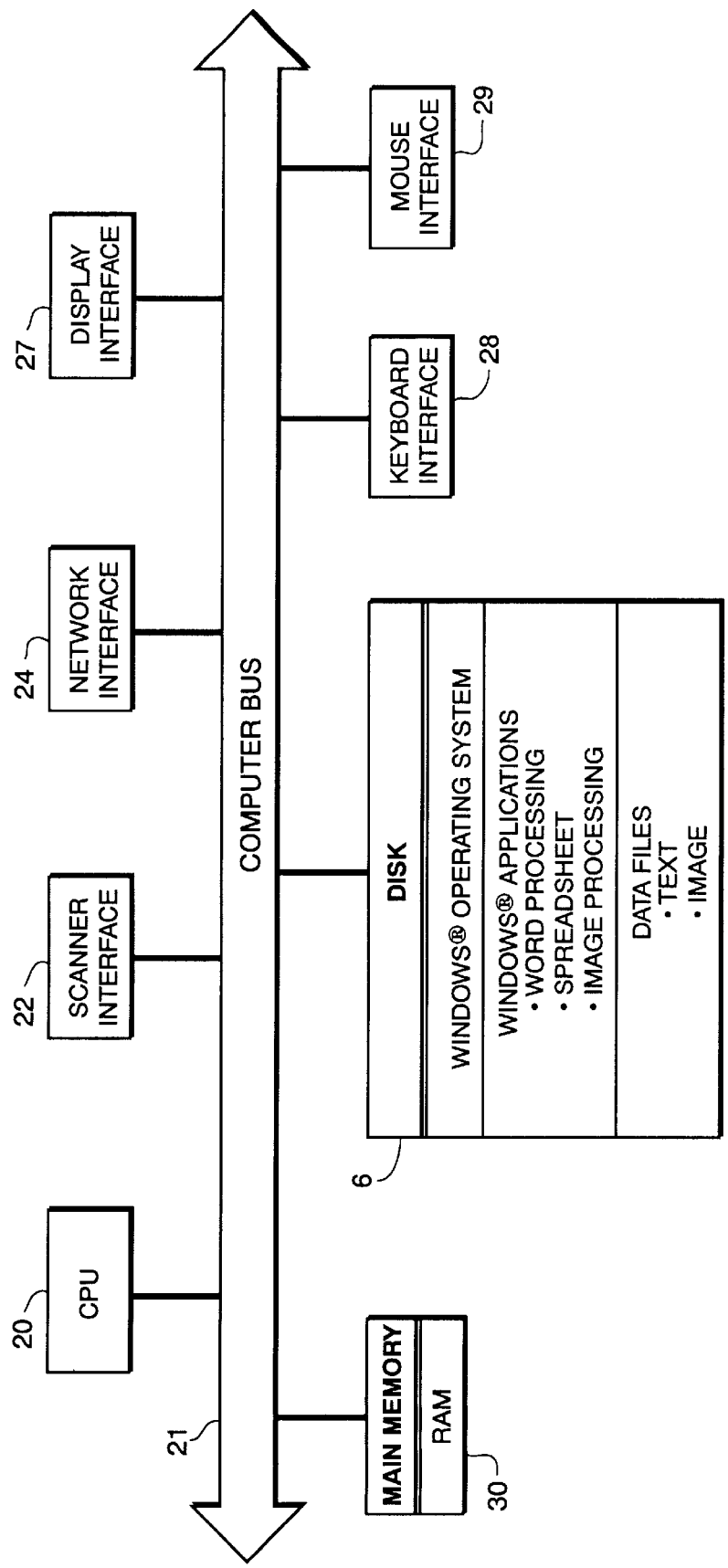
FIG. 2 is a block diagram of the workstation depicted in FIG. 1.

FIG. 2 is a block diagram showing the internal construction of computing equipment 1. As shown in FIG. 2, computing equipment 1 includes a central processing unit (CPU) 20 interfaced with computer bus 21. Also interfaced with computer bus 21 is scanner interface 22, network interface 24, display interface 27, keyboard interface 28, mouse interface 29, main memory 30 and disk 6.

Main memory 30 interfaces with computer bus 21 so as to provide random access storage for use by CPU 20 when executing stored program instructions, such as color reduction programs, image processing programs, and other application programs. More specifically, CPU 20 loads those programs from disk 6 into main memory 30 and executes those stored programs out of main memory 30.

Figure 3:
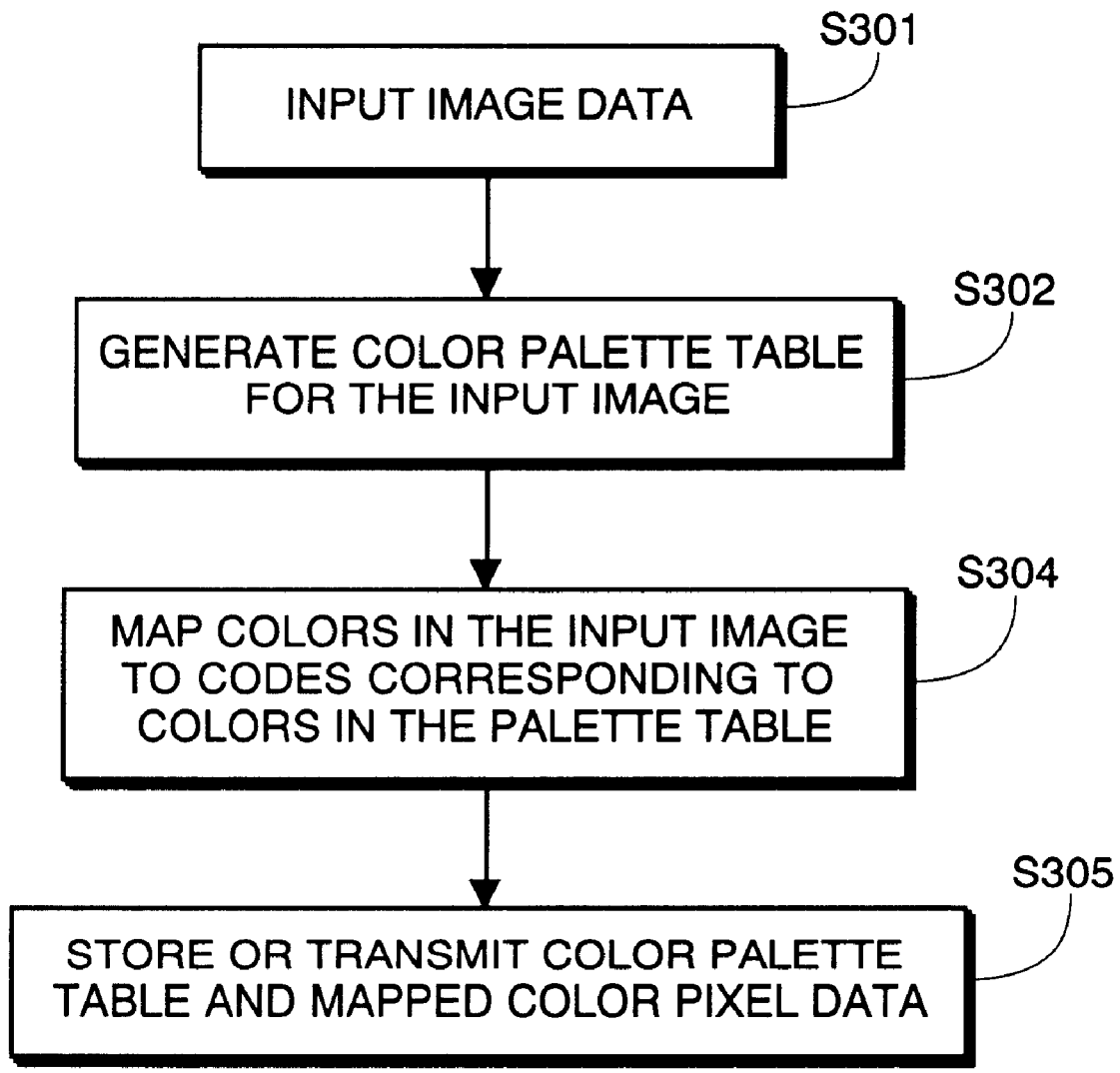
FIG. 3 is a flow diagram illustrating the processing steps for generating and using a color palette according to the first embodiment of the invention.

Operation of the preferred embodiment of the present invention will now be described with reference to FIG. 3. FIG. 3 is a flow diagram showing color reduction by generating and using a color palette according to the present invention. Preferably, the steps shown in FIG. 3 include computer executable process steps which can be initially stored on disk 6, subsequently downloaded from disk 6 to main memory 30 and then executed out of main memory 30. Briefly, according to FIG. 3, image data is input; a color palette is generated for the input image; colors in the input image are mapped to codes corresponding to colors in the palette; and the generated color palette, together with the mapped color pixel data, is stored or transmitted.

In more detail, in step S301, image data is input into computer equipment 1, such as by scanning a document using scanner 7. The image data may also be input from a variety of other sources, either directly using other image input devices such as a digital camera or indirectly via network interface 9. In any case, the input image data preferably is in bitmap form, with each pixel represented by 8-bit values for each of the red, green and blue color components. However, it should be understood that the image data may also be input in other formats, as well as other color spaces.

In step S302, a color palette is generated based on the input image data. This step is described in more detail below with reference to the flow diagram shown in FIG. 4.

In step S304, colors in the input image data are mapped to codes corresponding to colors in the generated palette. This step is described in more detail below with reference to the flow diagram shown in FIG. 11.

In step S305, the table of palette colors generated in step S302 and the palette color codes obtained in step S304 are stored or transmitted. For example, in this step the palette table and encoded data might be output to color monitor 2 for display by color monitor 2. Alternatively, the data might be stored, such as in disk 6, or transmitted to a remote location via network interface 9 for later display.

Figure 4:
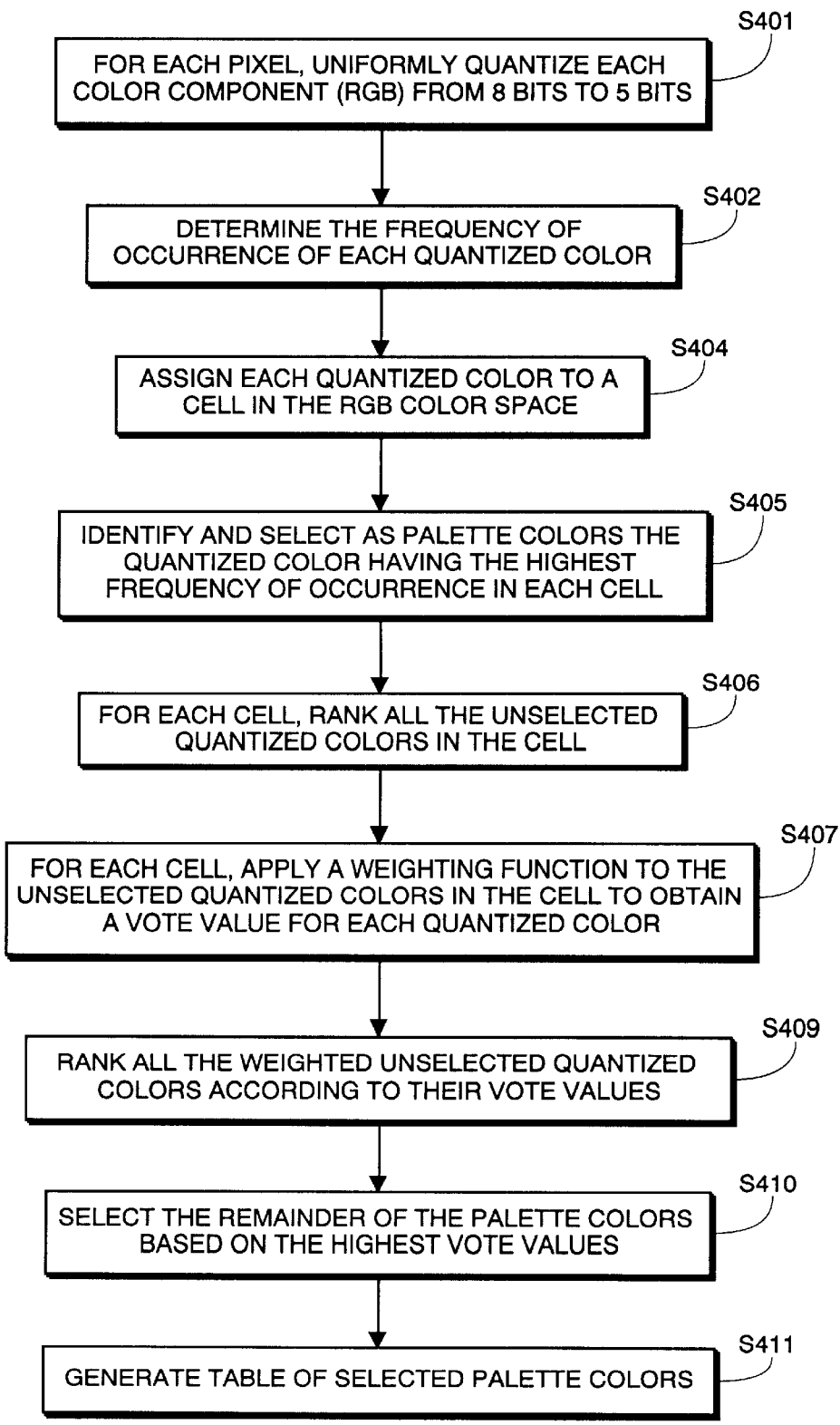
FIG. 4 is a flow diagram showing the processing steps for generating a color palette according to the first embodiment of the invention.

FIG. 4 is a flow diagram illustrating the generation of a color palette according to the present invention. Briefly, according to FIG. 4, each color component is uniformly quantized from 8 bits to 5 bits; the frequency of occurrence of each quantized color is determined; each quantized color is assigned to a cell in the RGB color space; for each cell having at least one quantized color, the quantized color having the highest frequency of occurrence in the cell is identified and selected as a palette color; on a cell-by-cell basis, all the unselected colors in the cell are ranked; a weighting function is applied to the unselected quantized colors in each cell to obtain a vote value for each quantized color; all the weighted unselected quantized colors are then ranked according to their vote values; and finally, the remainder of the palette colors are selected based on the highest vote values.

In more detail, in step S401 each color component (RGB) is uniformly quantized from 8 bits to 5 bits. Preferably, this step is performed by zeroing or eliminating the three least significant bits, such as by three right shifts. As a result, the number of discrete levels for each color component is reduced from 256 to 32. It should be noted that this step is not strictly necessary to the invention, and if used, other degrees of quantization could instead be employed. However, quantization from 8 bits to 5 bits has been found to provide good clustering of closely related colors, which is useful in determining frequency of occurrence for such closely related colors.

In step S402, the frequency of occurrence for each quantized color is determined. This step is preferably performed by simply counting the number of occurrences for each of the 32,768 (i.e., $32^3$) different possible quantized colors in the image data quantized in step S401.

In step S404, each color in the image data quantized in step S401 is assigned to a cell in the RGB color space. In this regard, the RGB color space is preferably divided into 216 approximately equal-size cells, as shown in FIG. 5. As can be seen in FIG. 5, each of the RGB color components preferably is divided into the following six intensity level ranges:

range 0: $0 \leq x < 6$
range 1: $6 \leq x < 11$
range 2: $11 \leq x < 16$
range 3: $16 \leq x < 21$
range 4: $21 \leq x < 26$
range 5: $26 \leq x < 32$ Thus, the first and last ranges are each six quantized intensity levels wide and the middle four ranges are five quantization levels wide. The resulting three-dimensional cells each contain from 125 (i.e., $5^3$) to 216 (i.e., $6^3$) quantized colors, depending on the dimension of the cell. Thus, an interior cell such as cell 51 will have dimensions 5×5×5 as shown in more detail in FIG. 6A. On the other hand, a cell such as cell 52 will have dimensions 5×5×6, as shown in more detail in FIG. 6B. Based on this division of the RGB color space, each quantized color is assigned to the cell into which its RGB values place it.

Although the color space is preferably divided into a predetermined number of cells having predetermined sizes, the precise number and size of the cells is not critical to the invention. In the preferred embodiment, the first and last range for each color component is slightly wider than the others because the human visual system is not as sensitive at these extreme dark and extreme light intensity levels. However, other cell shapes, sizes and configurations might instead be used. For Example, if the input color space is not RGB, then it might be desirable to use different shaped cells.

In step S405, each cell is examined separately. If the cell contains at least one quantized color, then the quantized color having the highest frequency of occurrence from among all quantized colors in that cell is selected as a palette color. As a result, a number n of palette colors is selected in this step, n being equal to the number of cells containing at least one quantized color from the image data. Therefore, the value of n in the preferred embodiment can range between 1 and 216, leaving 256-n palette colors still to be selected. For an image with well-dispersed color values, n will typically be close to 216; whereas for an image with a narrow color range (e.g., a forest scene) n will typically be substantially less than 216.

Figure 7A:
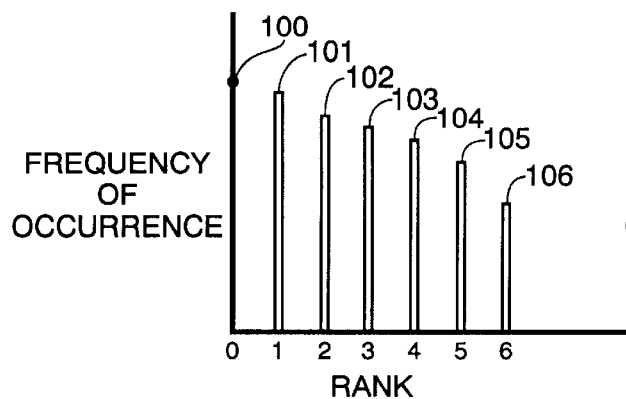
FIGS. 7A and 7B illustrate representative frequencies of occurrence for colors in the cells shown in FIGS. 6A and 6B, respectively.

In step S406, the unselected quantized colors are ranked on a cell-by-cell basis. In this regard, each of the n cells can have zero or more unselected colors. Thus, assume that cell 51 includes 7 quantized colors, colors 100 through 106, as shown in FIG. 7A. Color 100 was selected in step S405, leaving six unselected colors (i.e., colors 101 through 106) in cell 51. Each of colors 101 through 106 is ranked based on its relative frequency of occurrence. Thus, color 101 has a rank of 1, color 102 has a rank of 2, and so on.

Figure 7B:
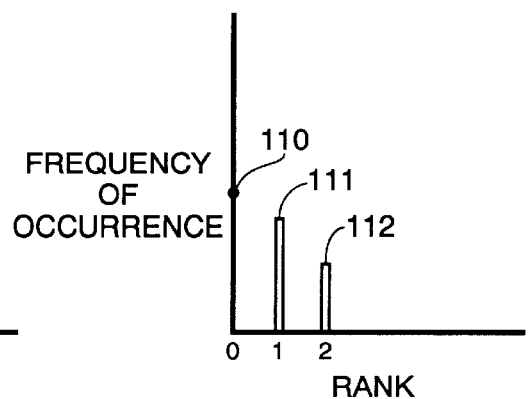

Similarly, assume that cell 52 includes three colors, as shown in FIG. 7B. Color 110 was selected in step S405 (even though other unselected colors in cell 51 have higher frequencies of occurrence), leaving two unselected colors (i.e., colors 101 and 102). Color 111 has the higher frequency of occurrence and is therefore assigned a rank of 1, with color 112 being assigned a rank of 2.

In step S407, a weighting factor is determined and a vote value obtained for each unselected quantized color in each cell. Preferably, the weighting function is a monotonically decreasing function based on the rank of the color determined in step S406. More preferably, the weighting function is specified as $$W(i) = 1 - \frac{i}{256},$$

where i is the rank of a color in its cell, as determined in step S406, and W(i) is the weighting factor corresponding to that rank.

A vote value is then determined for each unselected quantized color based on the color's frequency of occurrence and its weighting factor. Preferably, the vote value is calculated by multiplying the color's frequency of occurrence by the weighting factor corresponding to the color's cell rank.

Figure 8A:
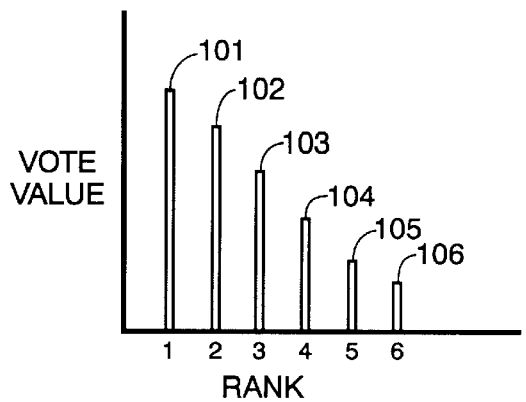
FIGS. 8A and 8B illustrate representative vote values for colors in the cells shown in FIGS. 6A and 6B, respectively.
Figure 8B:
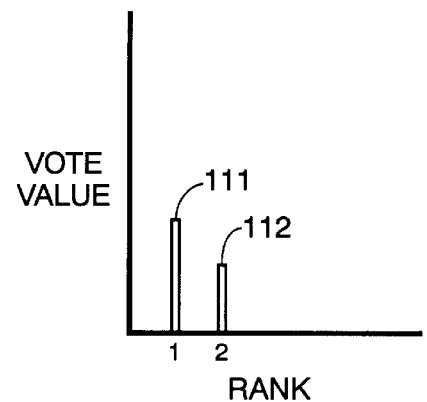

As a result of applying these weighting factors, the vote values for each of the colors shown in FIG. 7A are shown in FIG. 8A, and the vote values for the colors shown in FIG. 7B are shown in FIG. 8B. Comparing FIG. 8A with FIG. 7A and FIG. 8B with FIG. 7B, it can be seen that the vote values for lower ranking colors are decreased more, relative to their frequencies of occurrence, than are the vote values for higher ranking colors. Thus, the vote values for colors 101 and 111 are nearly equal to their respective frequencies of occurrence. On the other hand, the vote value for color 106 is significantly below its corresponding frequency of occurrence.

Figure 9:
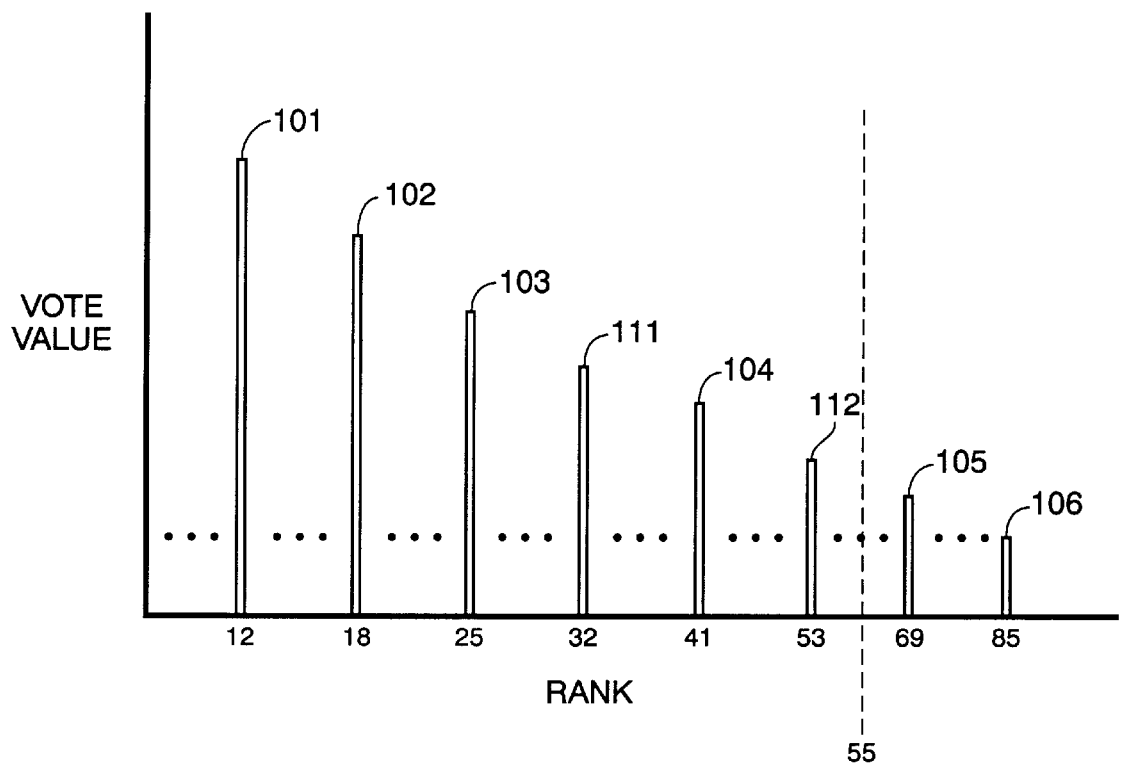
FIG. 9 illustrates ranking of colors by vote value according to the invention.

In step S409, all the weighted unselected colors from all cells are grouped together and ranked according to their vote values. FIG. 9 depicts one example of the ranking of the weighted unselected colors using the colors and corresponding vote values from FIGS. 8A and 8B. As shown in FIG. 9, color 111 has a higher rank than color 104, and color 112 has a higher rank than colors 105 and 106, even though colors 104, 105 and 106 each have a higher frequency of occurrence than each of colors 111 and 112, as can be seen by comparing FIGS. 7A and 7B. The ranking in this step can be performed by any conventional sorting technique, such a bubble sort technique.

In step S410, the remainder of the palette colors are selected based on the highest vote values of the weighted unselected quantized colors. For example, if n=201 colors were selected in step S405, then the remaining 55 palette colors are selected in this step. Referring again to FIG. 9, the colors corresponding to ranks 1 through 55 will be selected. As can be seen from this example, certain colors are selected from cell 52 even though they have lower frequencies of occurrence than unselected colors from cell 51. Accordingly, the present invention can typically achieve more dispersion of the selected palette colors than simply selecting palette colors based only on frequency of occurrence.

In step S411, a table of the selected palette colors is generated. An example of such a table is shown in FIG. 10A. As shown in FIG. 10A, there are 256 palette colors represented in the table, such as colors 151, 152 and 154. For each color in the table, there is a code entry 161, a cell entry 162, and RGB color component values 164 to 166, respectively. The code values 161 are preferably numbered 0 to 255 and can be assigned arbitrarily. However, for compression purposes it is preferable that the code values 161 be assigned based on the relative frequencies of occurrence of the palette colors in the image data.

Cell value 162 indicates the cell in which the palette color is located. The cell values could be simply numbered sequentially, for example, from 0 to 215. However, in the preferred embodiment the cells are designated by a three digit index, with each digit ranging from 0 to 5 and corresponding respectively to the range in which the respective RGB values of the palette color fall.

Finally, the table includes the RGB values for the palette color. Corresponding to the original input data, the RGB values are each represented by 8 bits, and therefore can range between 0 and 255. Since each color component value of the input colors was quantized by zeroing the three least significant bits, each RGB component is a multiple of 8. Accordingly, it might be preferable to store only the 5 most significant bits of the palette color RGB values, thereby reducing the required table capacity.

Figure 11:
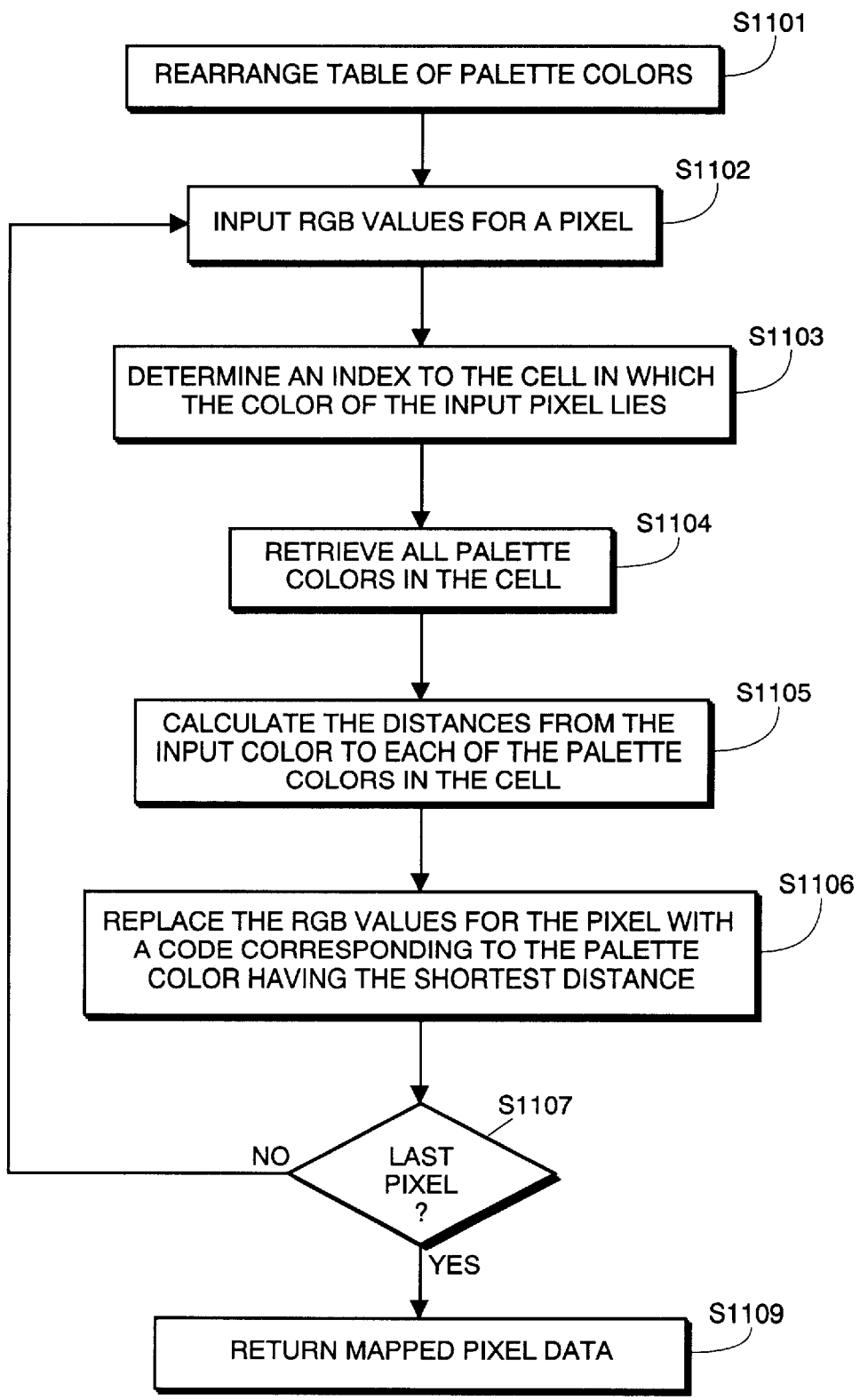
FIG. 11 is a flow diagram illustrating processing steps for mapping colors in an image to identified palette colors according to the first embodiment of the invention.

The steps for mapping input color image data to the palette colors generated in step S302 (i.e., for performing step S304) will now be described in detail with reference to FIG. 11. Briefly, according to FIG. 11, the table of palette colors is rearranged to group palette colors according to their respective cells; RGB values are input for a pixel; an index is determined for the cell in which the color of the input pixel lies; all palette colors in the identified cell are retrieved; the distance from the input color to each of the palette colors in the identified cell is calculated; the RGB values for the input pixel are replaced with a code corresponding to the palette color having the shortest distance to the input color; the foregoing steps are repeated for each pixel in the input image; and after processing each pixel, the mapped pixel data is output.

In more detail, in step S1101 the table of palette colors generated according to the steps shown in FIG. 4 (such as the table shown in FIG. 10A) is rearranged so as to group the palette colors according to their corresponding cells. The table preferably is rearranged so as to permit quick retrieval of all colors in any cell by supplying the cell's index. An example of a table rearranged according to this step is depicted in FIG. 10B, which lists for each cell the number of colors in the cell and the corresponding color component values for each such color. This step may be omitted if step S411 is implemented so as to generate a table having the palette colors already arranged according to their respective cells.

In step S1102, color component values for a pixel are input. In this embodiment, the color components are specified as 8-bit RGB values.

In step S1103, an index (I, J, K) to the one of the 6×6×6 cells in which the color of the input pixel lies is determined based on the color's RGB values. In the preferred embodiment, the (I, J, K) values are determined as follows:

$$\begin{cases} I = f\left(\frac{R}{8}\right), \\ J = f\left(\frac{G}{8}\right), \text{ where } f(x) = \begin{cases} 0, & 0 \le x < 6 \\ 1, & 6 \le x < 11 \\ 2, & 11 \le x < 16 \\ 3, & 16 \le x < 21 \\ 4, & 21 \le x < 26 \\ 5, & 26 \le x < 32 \end{cases} \\ K = f\left(\frac{B}{8}\right), \end{cases}$$

Note that division by 8 (i.e., R/8, G/8 and B/8) corresponds to the 5 bit quantization of step S401, and similarly can be achieved, e.g., by three right shifts.

In step S1104, the rearranged table of palette colors, such as the table shown in FIG. 10B, is searched to locate the cell 162 corresponding to the index determined in step S1103. All palette colors in that cell are then immediately retrieved. In this embodiment, since at least one palette color was selected from each cell containing an input color during generation of the palette colors, it is guaranteed that this step will retrieve at least one palette color.

In step S1105, the distance between the color of the input pixel and each of the palette colors retrieved in step S1104 is calculated. Preferably, these distances are calculated as follows:

$$D(k) = |R - R_k| + |G - G_k| - |B - B_k|,$$

where D(k) is the distance between the color component values (RGB) for the input color and the color component values ($R_kG_kB_k$) for the k'th palette color in the identified cell. However, these distances might also be determined using any other conventional technique, such as a Euclidean distance.

In step S1106, the shortest distance of the distances calculated in step S1105 is obtained, and the code value 161 of the corresponding palette color is identified. That 8-bit code value then replaces the 24-bit RGB values of the input pixel.

In step S1107, it is determined whether the current pixel is the last pixel. If not, processing proceeds to step S1102 in order to process the next pixel. Otherwise, in step S1109 the mapped pixel data is returned.

Figure 12:
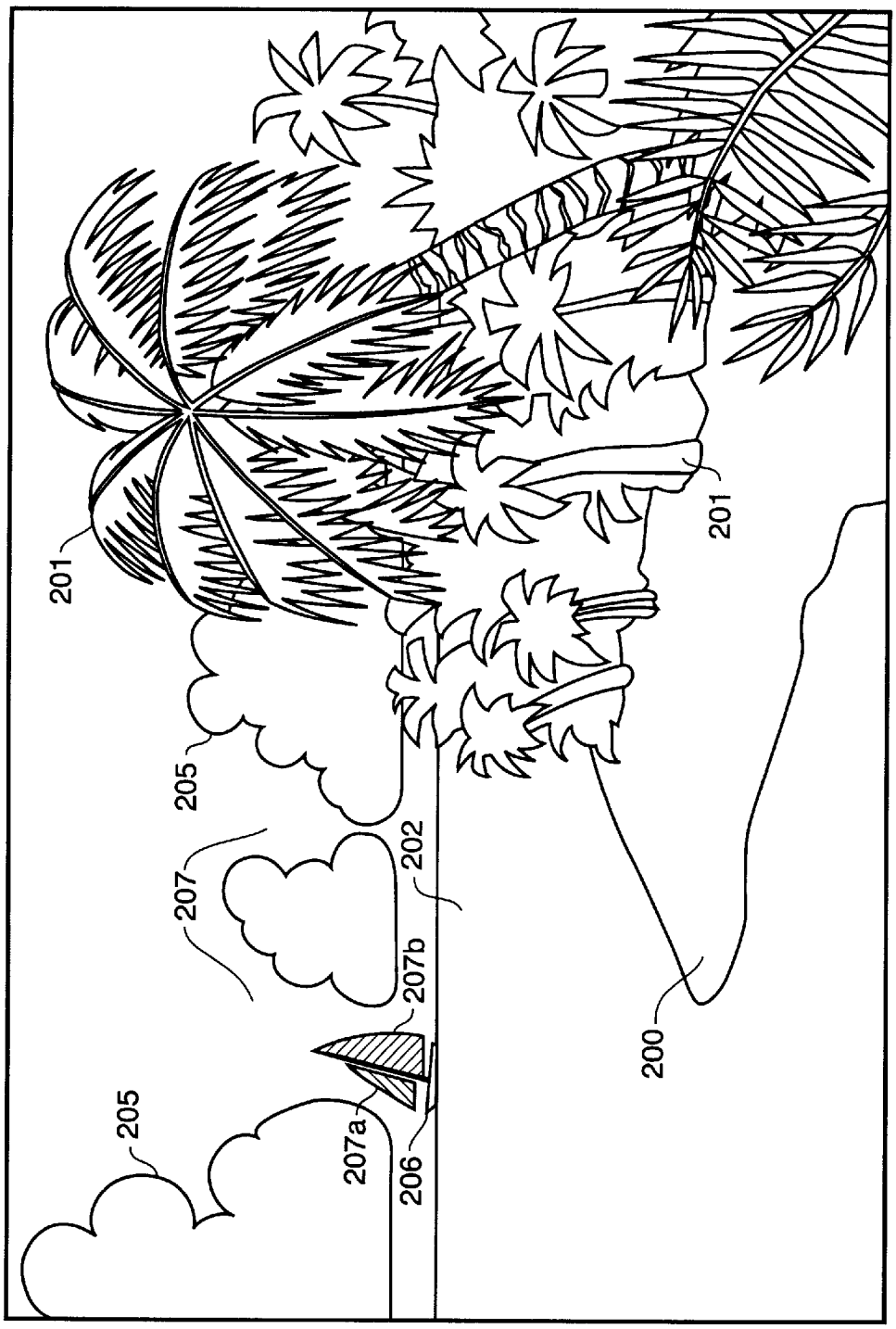
FIG. 12 is a black-and-white representation of a color image for illustrating advantages of the invention.

The advantages of the foregoing processing will now be described with respect to a representative image shown in FIG. 12. FIG. 12 is a black-and-white representation of a color image which includes sand 200, palm trees 201, sea 202, sky 204, clouds 205, and sail boat 206 having sails 207A and 207B. The colors of sand 200 are mostly shades of brown. The colors of palm trees 201 are mostly shades of browns and greens. Sea 202, sky 204 and clouds 205 are composed mostly of shades of blue, white and light gray. Sail 207A is one shade of red and sail 207B is another shade of red, and no other reds exist in the picture.

Thus, red pixels make up only a very small percentage of the pixels in the picture shown in FIG. 12. Nevertheless, due to the way that the palette colors are selected at least one palette color will be selected which is close to the color of sail 207A or 207B, whichever occurs more frequently. It is noted that in the preferred embodiment the selected palette color will not necessarily be identical to one of the two reds shown in FIG. 12 because in the preferred embodiment the palette colors are selected from among the quantized colors, not the original colors. In addition, a second red palette color close to the other red color in the picture might also be selected. Specifically, because of the invention's use of a weighting function based on the rank of a color in its cell, a color close to the second red might also be selected even though certain shades of blue, brown or green might occur more frequently in the picture. Thus, the invention can preserve infrequently appearing colors which nevertheless are important in the picture.

Figure 13:
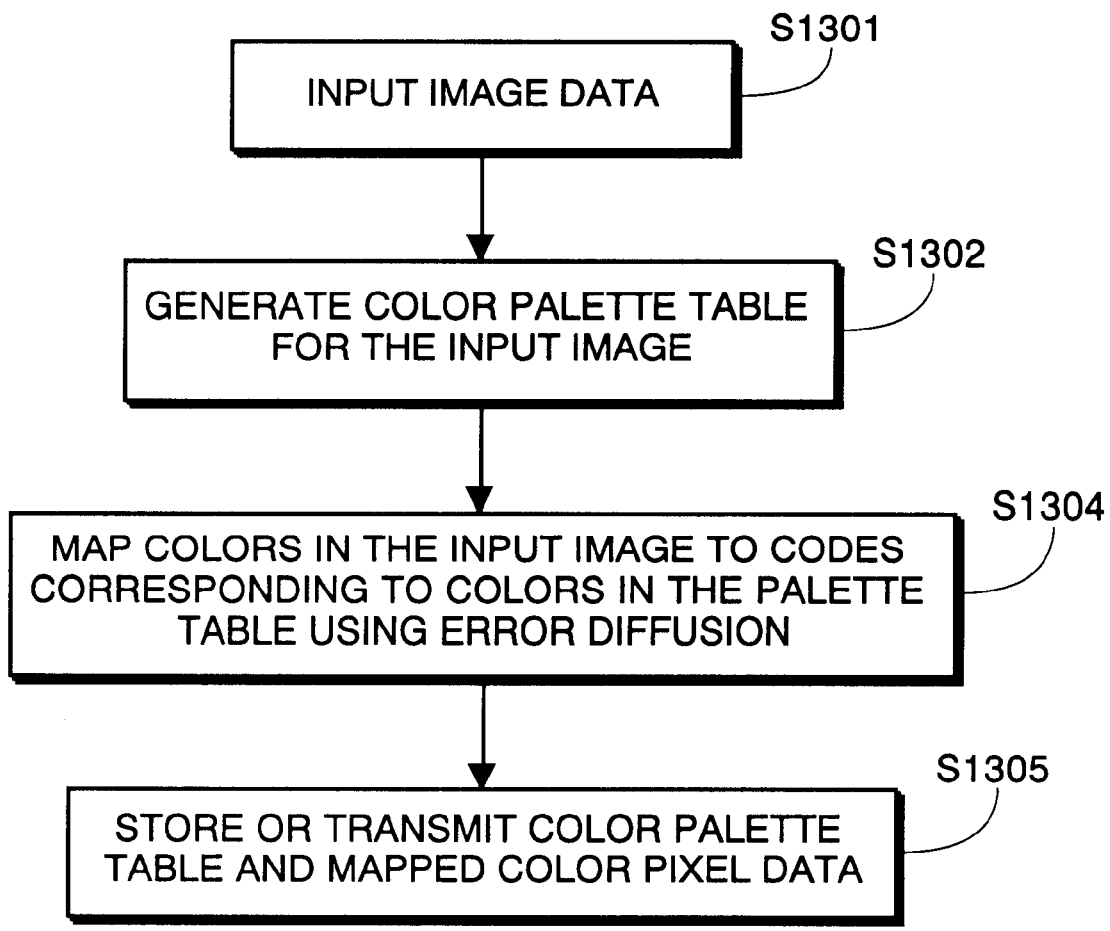
FIG. 13 is a flow diagram illustrating the processing steps for generating and using a color palette according to the second embodiment of the invention.

The second embodiment of the invention will now be described with reference to FIG. 13. FIG. 13 is a flow diagram illustrating the process steps according to the second embodiment of the invention. Preferably, the process steps shown in FIG. 13 are computer-executable, and can be initially stored on disk 6, downloaded into main memory 30, and then executed out of main memory 30. Briefly according to FIG. 13, image data is input; a color palette table is generated for the input image; colors in the input image are mapped to codes corresponding to the colors in the palette table using error diffusion; and the generated color palette table, together with the mapped color pixel data, is stored or transmitted.

In more detail, in Step S1301 image data is input, such as described above for step S301.

In S1302, a color palette table is generated for the input image, such as described above for step S302.

In step S1304, colors in the input image are mapped to codes corresponding to palette colors generated in step S1302 by using error diffusion. This step is described in more detail below with reference to the flow diagram depicted in FIG. 14.

In step S1305, the mapped color pixel data generated in step S304 is stored or transmitted, as described above for step S305.

Figure 14:
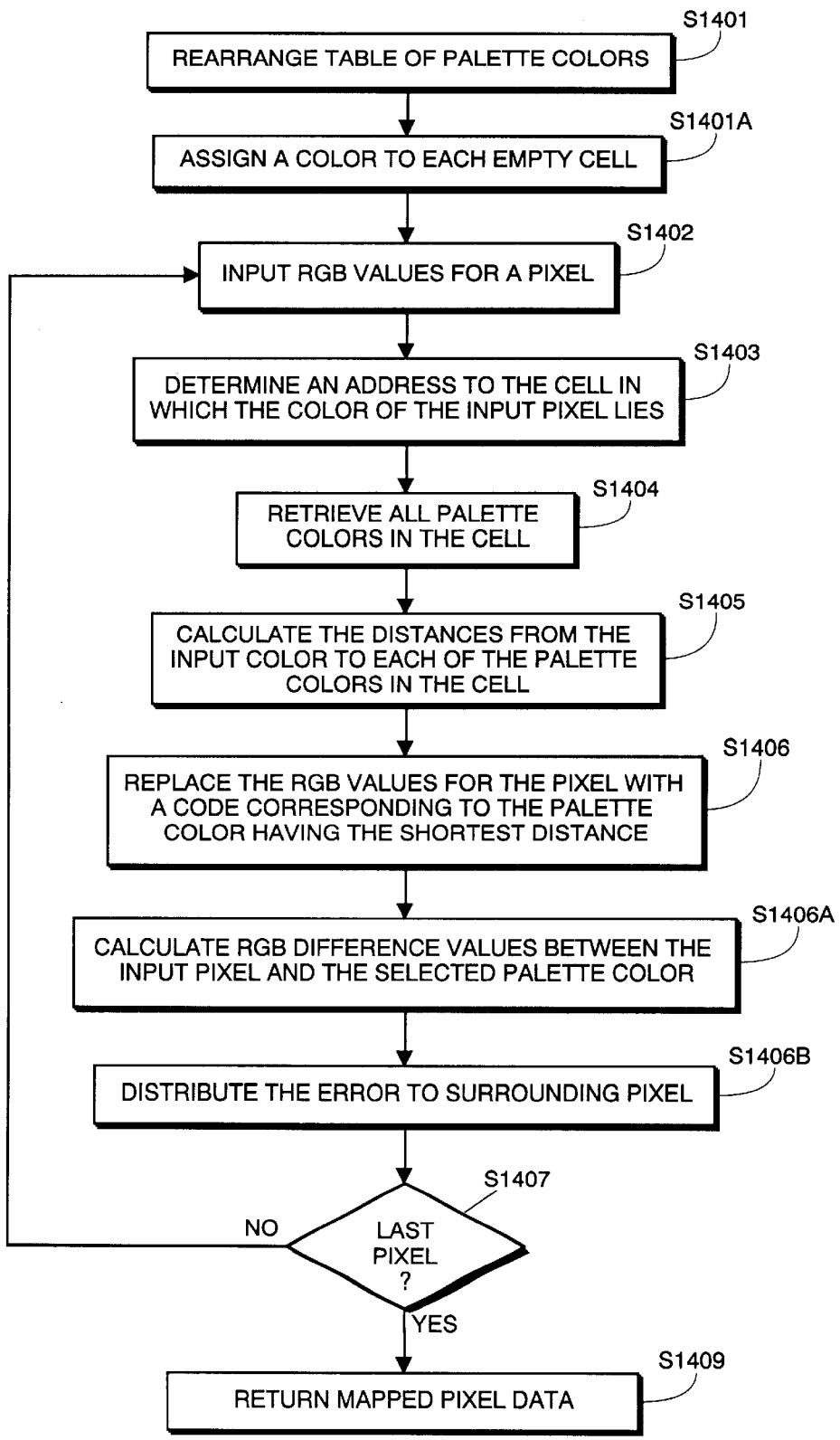
FIG. 14 is a flow diagram illustrating processing steps for mapping colors in an image to identified palette colors according to the second embodiment of the invention.

Mapping of colors in the input image data in the second embodiment of the invention will now be described with reference to the flow diagram in FIG. 14. Briefly, according to FIG. 14, the table of palette colors is rearranged to group palette colors according to their respective cells; a color is assigned to each empty cell; color component values are input for a pixel; an index is determined for the cell in which the color of the input pixel lies; all palette colors in the identified cell are retrieved; the distance from the input color to each of the palette colors in the cell is calculated; the RGB values for the input pixel are replaced with a code corresponding to the palette color having the shortest distance to the input color; the RGB difference values between the input pixel and the selected palette color are calculated; those difference values are then distributed to a surrounding pixel; the foregoing steps are repeated for each pixel in the input image; and the mapped pixel data is output.

In more detail, in step S1401 the table of palette colors is rearranged, such as described above for step S1101.

In step S1401A, each empty cell in the rearranged table of palette colors is assigned a color. Preferably, the color assigned to each empty cell is the palette color having the minimum distance to the center of the empty cell. In this regard, distance can be measured in any conventional manner, such as by using any of the distance measures described above for step S1105.

In step S1402, color component values are input for a pixel, such as described above for step S1102.

In step S1403, the address to the cell in which the input color lies is determined, such as described above for step S1103.

In step S1404, the rearranged table of palette colors, such as the table shown in FIG. 10B, is searched to locate the cell 162 corresponding to the index identified in step S1403. All palette colors in that cell are then immediately retrieved. In this embodiment, since a palette color was assigned to each previously empty cell in step S1401A, it is guaranteed that this step will retrieve at least one palette color.

In step S1405, the distances from the input color to each of the palette colors in the cell identified in step S1403 are determined, such as described above for step S1105.

In step S1406, the RGB values for the input pixel are replaced with the code corresponding to the palette color having the shortest distance, such as described above for step S1106.

In step S1406A, the differences between each of the RGB color component values for the input pixel and the respective RGB color component value for the palette color selected for the pixel in step S1406 are calculated as follows:

$$DR=R_i-R_p$$

$$DG=G_i-G_p$$

$$DB=B_i-B_p$$

where ($R_iG_iB_i$) are the respective RGB values for the input pixel and ($R_pG_pB_p$) are the respective RGB values for the palette color selected for the input pixel.

Figure 15:
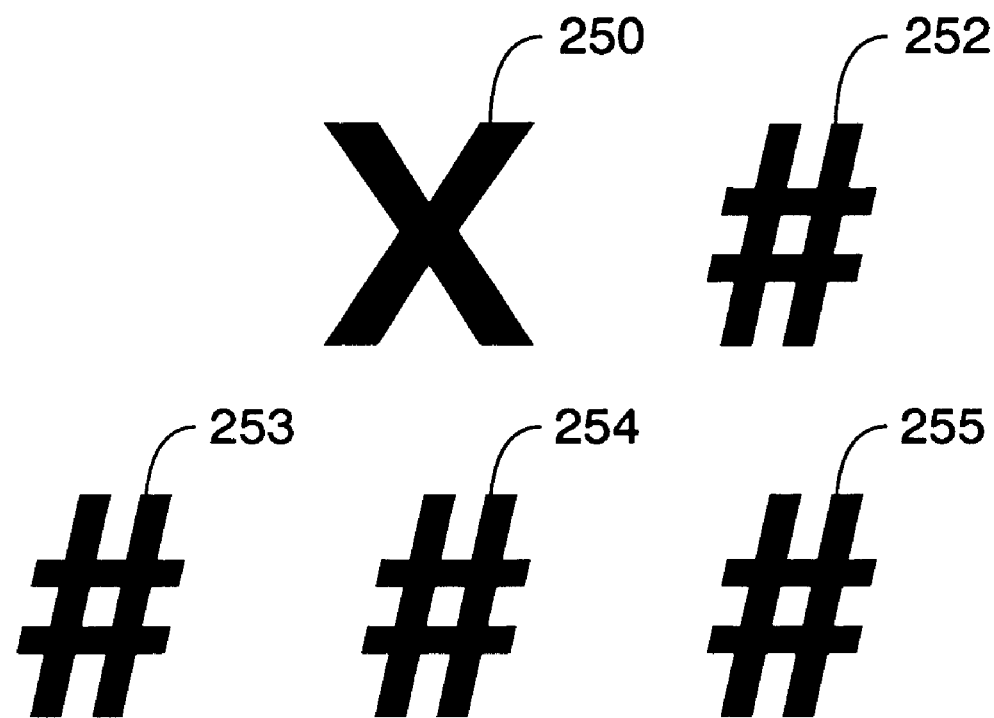
FIG. 15 illustrates distributing color mapping errors to a surrounding pixel according to the second embodiment of the invention.

In step S1406B, the difference values calculated in step S1406A are distributed to one or more surrounding pixels. Preferably, one of four surrounding pixels in randomly selected and the entire error is distributed to the selected pixel. More preferably, referring to FIG. 15, if the subject pixel is pixel 250 then one of the pixels 252 through 255 is randomly selected and the error is distributed to that pixel as follows:

$$R_j = R_j + DR$$

$$G_j = G_j + DG$$

$$B_j = B_j + DB$$

where $(R_j B_j G_j)$ are the RGB values for the randomly selected pixel. However, other conventional methods of error distribution may also be used.

In step S1407, a determination is made whether this is the last pixel. If so, the mapped pixel data are returned in step S1409. Otherwise, the next pixel is processed beginning in step S1402.

As a result of processing according to the second embodiment of the invention, the error which results when mapping the input color of one pixel to a palette color is frequently compensated when mapping an adjacent pixel.

The invention has been described above with respect to particular illustrative embodiments. However, it is to be understood that the invention is not limited to the above-described embodiments and that various changes and modifications may be made by those of ordinary skill in the art without departing from the spirit and scope of the invention.

What is claimed is:

1. A method for generating a color palette having m colors from a color image described in a color space, comprising:
   obtaining pixel image data corresponding to the color image;
   determining a frequency of occurrence for each color in the pixel image data;
   assigning each color in the pixel image data to one of a predetermined number of cells into which the color space has been partitioned, the predetermined number being not greater than m;
   a first selecting step of selecting the most commonly occurring color in each cell in which a color exists, so as to obtain n palette colors;
   calculating a vote value for each unselected color, the vote value being based at least in part on a product of the frequency of occurrence of the color in the pixel image times a weighting factor, the weighting factor based on a rank of the color in its corresponding cell, the unselected colors being the colors not selected in the first selecting step; and
   a second selecting step of selecting m-n colors as the unselected colors with the highest vote values.

2. A method according to claim 1, wherein the colors in the pixel image data correspond identically to the colors in the color image.

3. A method according to claim 1, wherein the colors in the pixel image are obtained by quantizing the colors in the color image.

4. A method according to claim 3, wherein the quantization step includes a step of setting to zero the three least significant bits of each color component.

5. A method according to claim 1, wherein the frequency of occurrence of a color is determined by counting the number of pixels in the pixel image data having that color.

6. A method according to claim 1, wherein the color space has been partitioned into approximately 216 cells.

7. A method according to claim 1, wherein the weighting factors monotonically decrease as the ranks decrease from the most frequently occurring unselected color to the least frequently occurring unselected color in a cell.

8. A method according to claim 7, wherein the weighting factors linearly decrease as the ranks decrease from the most frequently occurring unselected color to the least frequently occurring unselected color in a cell.

9. A method for generating a color palette having m colors from a color image comprising plural pixels, each pixel described in a color space, comprising:
   quantizing the color of each pixel in the color image by zeroing least significant bits of each color component for the pixel;
   counting the frequency of occurrence of each quantized color;
   assigning each quantized color in the color image to one of a predetermined number of cells into which the color space has been partitioned, the predetermined number being not greater than m;
   a first selecting step of selecting the most commonly occurring quantized color in each cell in which a quantized color exists, based on the count, so as to obtain n palette colors;
   ranking the unselected colors in each cell based on their relative frequencies of occurrence, with higher ranking colors occurring more frequently than lower ranking colors in the same cell, the unselected colors being the quantized colors not selected in the first selecting step;
   calculating a weighting factor for each unselected color, the weighting factor being based on the rank of the unselected color, with higher ranking colors receiving a greater weighting factor than lower ranking colors;
   assigning a vote value to each unselected color, the vote value being based at least in part on a product of the frequency of occurrence of the quantized color times the assigned weighting factor for the quantized color; and
   a second selecting step of selecting m-n palette colors as the unselected colors with the highest vote values.

10. A method according to claim 9, wherein in said quantizing step the three least significant bits of each color component are set to zero.

11. A method according to claim 9, wherein the color space has been partitioned into approximately 216 cells.

12. A method according to claim 9, wherein the weighting factors decrease linearly as the rank decreases from the most frequently occurring unselected color to the least frequently occurring unselected color in a cell.

13. A method according to claim 9, further comprising a step of sorting the quantized colors in each cell according to relative frequencies of occurrence.

14. A method according to claim 9, further comprising a step of sorting the unselected colors according to vote values.

15. Computer-executable process steps stored on a computer readable medium to generate a color palette having m colors from a color image described in a color space, comprising:
   an obtaining step to obtain pixel image data corresponding to the color image;
   a determining step to determine a frequency of occurrence for each color in the pixel image data;
   an assigning step to assign each color in the pixel image data to one of a predetermined number of cells into which the color space has been partitioned, the predetermined number being not greater than m;
   a first selecting step to select the most commonly occurring color in each cell in which a color exists, so as to obtain n palette colors;

a calculating step to calculate a vote value for each unselected color, the vote value being based at least in part on a product of the frequency of occurrence of the color in the pixel image times a weighting factor, the weighting factor based on a rank of the color in its corresponding cell, the unselected colors being the colors not selected in the first selecting step; and a second selecting step to select m-n colors as the unselected colors with the highest vote values.

16. Computer-executable process steps according to claim 15, wherein the colors in the pixel image data correspond identically to the colors in the color image.

17. Computer-executable process steps according to claim 15, wherein the colors in the pixel image are obtained by quantizing the colors in the color image.

18. Computer-executable process steps according to claim 17, wherein the quantization step includes a step to set to zero the three least significant bits of each color component.

19. Computer-executable process steps according to claim 15, wherein the frequency of occurrence of a color is determined by counting the number of pixels in the pixel image data having that color.

20. Computer-executable process steps according to claim 15, wherein the color space has been partitioned into approximately 216 cells.

21. Computer-executable process steps according to claim 15, wherein the weighting factors monotonically decrease as the ranks decrease from the most frequently occurring unselected color to the least frequently occurring unselected color in a cell.

22. Computer-executable process steps according to claim 21, wherein the weighting factors linearly decrease as the ranks decrease from the most frequently occurring unselected color to the least frequently occurring unselected color in a cell.

23. Computer-executable process steps stored on a computer readable medium to generate a color palette having m colors from a color image comprising plural pixels, each pixel described in a color space, comprising:

a quantizing step to quantize the color of each pixel in the color image by zeroing least significant bits of each color component for the pixel;

a counting step to count the frequency of occurrence of each quantized color;

a cell assigning step to assign each quantized color in the color image to one of a predetermined number of cells into which the color space has been partitioned, the predetermined number being not greater than m;

a first selecting step to select the most commonly occurring quantized color in each cell in which a quantized color exists, based on the count, so as to obtain n palette colors;

a ranking step to rank the unselected colors in each cell based on their relative frequencies of occurrence, with higher ranking colors occurring more frequently than lower ranking colors in the same cell, the unselected colors being the quantized colors not selected in the first selecting step;

a calculating step to calculate a weighting factor for each unselected color, the weighting factor being based on the rank of the unselected color, with higher ranking colors receiving a greater weighting factor than lower ranking colors;

a vote value assigning step to assign a vote value to each unselected color, the vote value being based at least in part on a product of the frequency of occurrence of the quantized color times the assigned weighting factor for the quantized color; and a second selecting step to select m-n palette colors as the unselected colors with the highest vote values.

24. Computer-executable process steps according to claim 23, wherein in said quantizing step the three least significant bits of each color component are set to zero.

25. Computer-executable process steps according to claim 23, wherein the color space has been partitioned into approximately 216 cells.

26. Computer-executable process steps according to claim 23, wherein the weighting factors decrease linearly as the rank decreases from the most frequently occurring unselected color to the least frequently occurring unselected color in a cell.

27. Computer-executable process steps according to claim 23, further comprising a step of sorting the quantized colors in each cell according to relative frequencies of occurrence.

28. Computer-executable process steps according to claim 23, further comprising a step to sort the unselected colors according to vote values.

29. An apparatus for generating a color palette having m colors from a color image described in a color space, comprising:

input means for inputting pixel image data corresponding to the color image;

a memory for storing the pixel image data and executable process steps; and a processor for executing the process steps stored in said memory so as to (1) determine a frequency of occurrence for each color in the pixel image data, (2) assign each color in the pixel image data to one of a predetermined number of cells into which the color space has been partitioned, the predetermined number being not greater than m, (3) select the most commonly occurring color in each cell in which a color exists, so as to obtain n palette colors, (4) calculate a vote value for each unselected color, the vote value being based at least in part on a product of the frequency of occurrence of the color in the pixel image times a weighting factor based on a rank of the color in its corresponding cell, the unselected colors being the colors not selected in the first selecting step, and (5) select m-n colors as the unselected colors with the highest vote values.

30. An apparatus according to claim 29, wherein the colors in the pixel image data correspond identically to the colors in the color image.

31. An apparatus according to claim 29, wherein the colors in the pixel image are obtained by quantizing the colors in the color image.

32. An apparatus according to claim 31, wherein the quantization step includes a step to set to zero the three least significant bits of each color component.

33. An apparatus according to claim 29, wherein the frequency of occurrence of a color is determined by counting the number of pixels in the pixel image data having that color.

34. An apparatus according to claim 29, wherein the color space has been partitioned into approximately 216 cells.

35. An apparatus according to claim 29, wherein the weighting factors monotonically decrease as the ranks decrease from the most frequently occurring unselected color to the least frequently occurring unselected color in a cell.

36. An apparatus according to claim 35, wherein the weighting factors linearly decrease as the ranks decrease from the most frequently occurring unselected color to the least frequently occurring unselected color in a cell.

37. An apparatus for generating a color palette having m colors from a color image comprising plural pixels, each pixel described in a color space, comprising:
  input means for inputting pixel image data corresponding to the color image;
  a memory for storing the pixel image data and executable process steps; and
  a processor for executing the process steps stored in said memory so as to (1) quantize the color of each pixel in the color image by zeroing least significant bits of each color component for the pixel, (2) count the frequency of occurrence of each quantized color, (3) assign each quantized color in the color image to one of a predetermined number of cells into which the color space has been partitioned, the predetermined number being not greater than m, (4) select the most commonly occurring quantized color in each cell in which a quantized color exists, based on the count, so as to obtain n palette colors, (5) rank the unselected colors in each cell based on their relative frequencies of occurrence, with higher ranking colors occurring more frequently than lower ranking colors in the same cell, the unselected colors being the quantized colors not selected in the first selecting step, (6) calculate a weighting factor for each unselected color, the weighting factor being based on the rank of the unselected color, with higher ranking colors receiving a greater weighting factor than lower ranking colors, (7) assign a vote value to each unselected color, the vote value being based at least in part on a product of the frequency of occurrence of the quantized color times the assigned weighting factor for the quantized color, and (8) select m-n palette colors as the unselected colors with the highest vote values.

38. An apparatus according to claim 37, wherein in said quantizing step the three least significant bits of each color component are set to zero.

39. An apparatus according to claim 37, wherein the color space has been partitioned into approximately 216 cells.

40. An apparatus according to claim 37, wherein the weighting factors decrease linearly as the rank decreases from the most frequently occurring unselected color to the least frequently occurring unselected color in a cell.

41. An apparatus according to claim 37, further comprising a step to sort the quantized colors in each cell according to relative frequencies of occurrence.

42. An apparatus according to claim 37, further comprising a step to sort the unselected colors according to vote values.

43. A method for generating a color palette having m palette colors from a color image described in a color space, comprising:
  selecting n palette colors as representative colors from a number of cells into which the color space has been partitioned and colors of the input image have been assigned, wherein a color selection associated with a cell is made independent of another cell's color selection, each color selection based on a frequency of occurrence of colors within the cell; and
  selecting m-n palette colors from remaining colors based at least in part on the frequency of occurrence of the remaining colors across the entire input image.

44. Computer-executable process steps stored on a computer readable medium to generate a color palette having m colors from a color image described in a color space, comprising:
  a first selecting step to select n palette colors as representative colors from a number of cells into which the color space has been partitioned and colors of the input image have been assigned, wherein a color selection associated with one cell is made independent of another cell's color selection, each color selection based on a frequency of occurrence of colors within the cell ; and
  a second selecting step to select m-n palette colors from remaining colors based at least in part on the frequency of occurrence of the remaining colors in the input image.

45. A method for generating a color palette having m palette colors from a color image described in a color space, comprising:
  selecting n palette colors as representative colors from a number of cells into which the color space has been partitioned and colors of the input image have been assigned, based on a first criteria that selects a representative color from a cell, one cell's color selection being independent of another cell's color selection, the first criteria includes a frequency of occurrence of colors within the cell; and
  selecting m-n palette colors from remaining colors based on a second criteria that is different from said first criteria.

46. A method according to claim 45 wherein the second criteria comprises a weighted frequency which is based at least in part on a frequency ranking within the cells.

47. Computer-executable process steps stored on a computer readable medium to generate a color palette having m colors from a color image described in a color space, comprising:
  a first selecting step to select n palette colors as representative colors from a number of cells into which the color space has been partitioned and colors of the input image have been assigned, based on a first criteria that selects a representative color from a cell, one cell's color selection being independent of another cell's color selection, the first criteria includes a frequency of occurrence of colors within the cell; and
  a second selecting step to select m-n palette colors from remaining colors based on a second criteria that is different from said first criteria.

48. Computer-executable process steps according to claim 46 wherein the second criteria comprises a weighted frequency which is based at least in part on a frequency ranking within the cells.

49. A method according to claim 43, wherein the m-n palette colors are selected based on a ranking of the remaining colors across all of the cells, the ranking is based at least in part on the frequency of occurrence of a remaining color relative to other remaining colors in a cell.

50. A method according to claim 49, wherein the ranking comprises a weighted frequency which is based at least in part on a frequency ranking within the cells.

51. Computer executable process steps according to claim 44, wherein the m-n palette colors are selected based on a ranking of the remaining colors across all of the cells, the ranking is based at least in part on the frequency of occurrence of a remaining color relative to other remaining colors in a cell.

52. A method according to claim 51, wherein the ranking comprises a weighted frequency which is based at least in part on a frequency ranking within the cells.

* * * * *

UNITED STATES PATENT AND TRADEMARK OFFICE
CERTIFICATE OF CORRECTION

PATENT NO.    : 6,518,981 B2
DATED         : February 11, 2003
INVENTOR(S)   : Jun Zhao et al.

It is certified that error appears in the above-identified patent and that said Letters Patent is hereby corrected as shown below:

<u>Title page,</u>
Item [*] Notice, insert -- This patent issued on a continued prosecution application filed under 37 CFR 1.53(d), and is subject to the twenty year patent term provisions of 35 U.S.C. 154(a)(2). --

<u>Column 8,</u>
Line 64, "-|B-Bk|," should read -- +|B-Bk|, --.

<u>Column 16,</u>
Line 9, "colors in the" should read -- colors across the entire --;
Lines 25 and 43, "criteria." should read -- criteria, wherein the second criteria is based at least in part on a frequency of occurrence of the remaining colors across the entire image. --; and
Line 45, "46" should read -- 47 --.

Signed and Sealed this

Second Day of March, 2004

JON W. DUDAS
*Acting Director of the United States Patent and Trademark Office*